United States Patent
Rook et al.

(10) Patent No.: US 10,990,065 B2
(45) Date of Patent: Apr. 27, 2021

(54) MECHANICAL CLOCK

(71) Applicant: BENTLEY MOTORS LIMITED, Crewe (GB)

(72) Inventors: David Alan Rook, Sandbach (GB); Richard Hartley, Nottingham (GB)

(73) Assignee: BENTLEY MOTORS LIMITED, Crewe (GB)

( * ) Notice: Subject to any disclaimer, the term of this patent is extended or adjusted under 35 U.S.C. 154(b) by 247 days.

(21) Appl. No.: 15/749,776

(22) PCT Filed: Jul. 29, 2016

(86) PCT No.: PCT/GB2016/052352
§ 371 (c)(1),
(2) Date: Feb. 1, 2018

(87) PCT Pub. No.: WO2017/032970
PCT Pub. Date: Mar. 2, 2017

(65) Prior Publication Data
US 2020/0089167 A1     Mar. 19, 2020

(30) Foreign Application Priority Data
Aug. 27, 2015   (GB) .................................... 1515239

(51) Int. Cl.
G04B 7/00 (2006.01)
G04C 1/00 (2006.01)
B60R 16/03 (2006.01)
G04D 7/00 (2006.01)

(52) U.S. Cl.
CPC ................ *G04C 1/00* (2013.01); *B60R 16/03* (2013.01); *G04D 7/009* (2013.01)

(58) Field of Classification Search
CPC ........... G04D 7/009; G04C 1/00; B60R 16/03
See application file for complete search history.

(56) References Cited

U.S. PATENT DOCUMENTS

| | | | | |
|---|---|---|---|---|
| 4,747,280 A | * | 5/1988 | Shaw ................. | E05B 47/0002 211/64 |
| 2002/0095226 A1 | * | 7/2002 | Suzuki ................. | G04C 3/146 700/56 |
| 2008/0247278 A1 | | 10/2008 | Walker et al. | |
| 2009/0274013 A1 | * | 11/2009 | Yang ....................... | G04C 1/00 368/147 |

(Continued)

FOREIGN PATENT DOCUMENTS

| | | |
|---|---|---|
| DE | 102011118952 A1 | 5/2013 |
| EP | 1780614 A1 | 5/2007 |
| GB | 777897 A | 6/1957 |

OTHER PUBLICATIONS

English copy of DE 102011118952—patents.google.com—Jan. 24, 2020.*

(Continued)

*Primary Examiner* — Sean Kayes
(74) *Attorney, Agent, or Firm* — Schwabe Williamson & Wyatt, P.C.

(57) ABSTRACT

The invention relates to a mechanical clock having a winding mechanism and a means to automatically wind the winding mechanism of the clock; wherein the automatic winding means is directly or indirectly powered or actuated by an electrical system of a motor vehicle, in use.

17 Claims, 1 Drawing Sheet

(56) References Cited

U.S. PATENT DOCUMENTS

Figure 1:
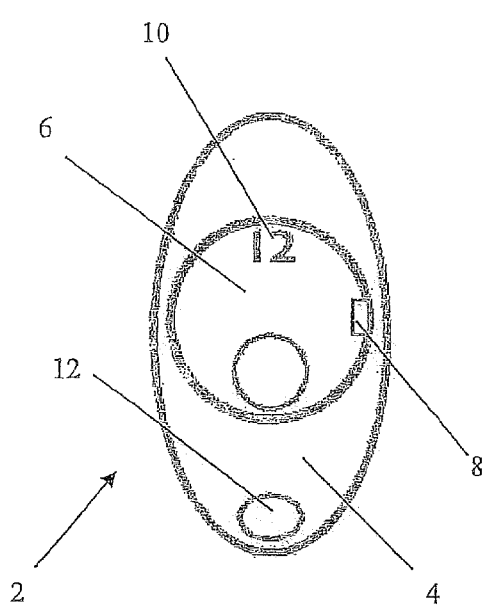

| | | | | |
|---|---|---|---|---|
| 2010/0165799 A1* | 7/2010 | Huang | ..................... | G04B 5/00 |
| | | | | 368/210 |
| 2014/0177400 A1* | 6/2014 | Born | ........................ | G04C 1/00 |
| | | | | 368/207 |
| 2015/0224859 A1* | 8/2015 | Warburton | ................ | E05F 5/12 |
| | | | | 701/49 |
| 2015/0227114 A1* | 8/2015 | Perrinjaquet | .......... | F16M 11/04 |
| | | | | 248/116 |

OTHER PUBLICATIONS

International Patent Application No. PCT/GB2016/052352; International Preliminary Report on Patentability; dated Mar. 8, 2018.

* cited by examiner

MECHANICAL CLOCK

CROSS REFERENCE TO RELATED APPLICATIONS

The present application is a national phase entry under 35 U.S.C. § 371 of International Application No. PCT/GB2016/052352, filed Jul. 29, 2016, entitled "A MECHANICAL CLOCK," which designated, among the various States, the United States of America, and which claims priority to GB 1515239.0 filed Aug. 27, 2015, both of which are hereby incorporated by reference.

TECHNICAL FIELD OF THE INVENTION

The present invention relates to improvements in or relating to clocks, and in particular to mechanical clocks.

BACKGROUND TO THE INVENTION

Mechanical clocks are well known and are perceived as high luxury given the strong technical skill and craftsmanship involved in their manufacture. Clocks of this type comprise a winding mechanism which must be periodically wound in order for the clock to maintain its function. Fixed mechanical clocks generally must be wound using a winding key or similar. However, portable clocks, for example watches, have been developed whereby the winding mechanism of the watch is wound through natural movement of the watch itself, for example, when worn on a user's wrist. Such watches may be referred to as "automatic" watches. An automatic watch self-winds using the movement of the wearer, such as the movement of the wearer's wrist or arm during every day movements such as walking. The movement of the wrist, arm and body cause a metal weight attached to a winding mechanism ("the rotor"), to pivot freely on its axis in the centre of the movement. The rotor rotates back and forth in a generally circular motion through action of the wrist, arm or body of the user. The rotor's movement winds the main spring, generally a flat coiled spring that powers mechanical watches.

It is common for clocks to be included within a motor vehicle. Clocks of this type are commonly battery or electrically powered rather than mechanical. However, it would be advantageous to be able to provide a mechanical clock within a vehicle given the perceived higher level of quality. Unfortunately, given the requirements of mechanical clocks to be wound periodically, it is not at present possible to do so without the need for a user to manually wind the clock given that the natural movement of a vehicle will not necessarily automatically wind the clock. Furthermore, given that it is possible in some situations for a vehicle to remain idle for a long period of time, such as overnight for example, a known mechanical clock within a vehicle would not function properly as it would not be wound frequently enough. It would therefore be advantageous to provide a mechanical clock which can be located within a vehicle which does not suffer the drawbacks of the prior art.

It is therefore an aim of an embodiment or embodiments of the present invention to provide a mechanical clock which is an improvement on the prior art.

SUMMARY OF THE INVENTION

According to a first aspect of the present invention there is provided a mechanical clock having a winding mechanism and a means to automatically wind the winding mechanism of the clock; wherein the automatic winding means is directly or indirectly powered or actuated by an electrical system of a motor vehicle, in use.

The clock may be an automatic clock. The automatic clock may function as hereinabove described with reference to automatic watches.

In this way, the electrical system of a connected motor vehicle may power the winding of the winding mechanism without the need for a user to manually wind the mechanism. The mechanical clock of the present invention therefore allows for the provision of a mechanical clock within a vehicle without the drawbacks of the prior art.

In some embodiments, the automatic winding means may be operable in use to continuously wind the winding mechanism. Alternatively, the automatic winding means may be operable in use to wind the winding mechanism in a periodic manner. The automatic winding means may be operable to wind the winding mechanism at least every 10 minutes, or at least every 30 minutes, or at least every 45 minutes, or at least every 1 hour, for example. The automatic winding means may be operable to wind the winding mechanism for at least 1 minute, or at least 2 minutes, or at least 5 minutes, for example.

In some embodiments the automatic winding means may comprise a winding key which is mechanically connected to the winding mechanism by means of one or more rotational cogs. In this way, the winding key may be operable in use to rotate axially to automatically wind the winding mechanism, with the rotation of the winding key being powered by the electrical system of the connected vehicle.

In embodiments in which the mechanical clock is an automatic clock, the automatic clock may comprise means to automatically wind the winding mechanism of the clock through movement of the clock, and the means to automatically wind the winding mechanism may comprise a means to move the clock. The means to move the clock may comprise a means to rotate the clock.

Therefore in a second aspect of the invention there is provided an automatic mechanical clock comprising a winding mechanism and a means to automatically wind the winding mechanism of the clock through movement of the clock, preferably rotational movement, wherein the movement is powered or actuated by an electrical systems of the motor vehicle, in use.

In a third aspect of the invention there is provided an automatic mechanical clock comprising an automatic winding mechanism powered or actuated by movement of the clock, and further comprising a clock movement mechanism powered by an electrical system of a motor vehicle, in use.

In a fourth aspect of the invention there is provided a motor vehicle to which is connected an automatic mechanical clock comprising an automatic winding mechanism powered by movement of the clock and a clock movement mechanism powered by an electrical system of the motor vehicle.

In some embodiments the clock is an automatic clock including a winding key, the winding key comprising a rotational cog which rotates the entire clock. In this way, the winding key may be operable to rotate axially in order to rotate the entire clock, and actuate the automatic, self-winding mechanism.

In other embodiments the automatic winding means may comprise a portion of the face of the clock operably connected to the winding mechanism. In such embodiments, the face of the clock may be rotatable in order to wind the winding mechanism.

In embodiments wherein the clock or face of the clock is rotatable, the clock or face may be operable to rotate fully (i.e. 360°) in order to wind the winding mechanism. In such embodiments, the clock or face of the clock may be operable to continuously rotate to wind the winding mechanism for the length of time for which the winding mechanism is to be wound. In other embodiments the clock or face may rotate only partly (i.e. less than 360°). In such embodiments, the clock or face of the clock may be operable to repeatedly rotate to a certain extent to wind the winding mechanism for the length of time for which the winding mechanism is to be wound. In either case, the automatic winding means may be operable in use such that subsequent to rotation of the clock or face for the set period of time, the clock or face is returned to a set position.

In some embodiments the face of the clock comprises one or more indicators thereon which may comprise numerals, such as Arabic numerals or Roman numerals, for example. Preferably, in embodiments wherein the clock or face of the clock is rotatable, the set position to which the clock or face is returned subsequent to winding comprises a position whereby the indicator for 12 o'clock is centred at the top of the clock.

The mechanical clock may additionally comprise a positional sensor. In some embodiments the sensor may be operable in use to determine the rotational position of the clock itself, or in some embodiments the rotational position of the face of the clock. In this way, the sensor may be operable in use to determine whether the clock or face of the clock has been returned to its set position subsequent to winding. Furthermore, the sensor may be operable to determine whether the clock itself is returned to a correct configuration subsequent to movement of the clock itself. In some embodiments the positional sensor comprises an optical sensor.

The electrical system of the vehicle will commonly be powered by a battery, such as a car battery, for example. In some embodiments the automatic winding means of the mechanical clock may be operable in use to automatically wind the winding mechanism of the clock irrespective of whether the engine of the vehicle is operational or is turned off. In this way, the automatic winding process may carry on even when the vehicle is not in use.

In some embodiments the mechanical clock comprises a rotational mechanism operable in use to rotate the hands of the clock to indicate the time to a user. In such embodiments, the rotational mechanism may also be powered by the electrical system of the connected vehicle. In this way, the time displayed by the hands of the clock may be altered automatically by the vehicle, or by a user's interaction with the vehicle. In further embodiments the rotational mechanism of the clock may not be electrically connected to the vehicle. In such embodiments, the mechanical clock may additionally comprise a crown wheel operable in use to act upon the rotational mechanism to move the hands of the clock. In such embodiments, the mechanical clock may also comprise a means to move the clock itself in such a way so as to present the crown wheel to a user for altering the time displayed by the clock itself. In some embodiments the movement means may be operable to rotate the clock into such a position. In this way, the mechanical clock of the invention provides a means to rotate the clock itself into a position whereby the time displayed may be altered manually, and subsequently return the clock to its initial position.

In some embodiments the mechanical clock may additionally comprise a user interface switch. The interface switch may be operable in use to override the automatic winding operation of the winding mechanism. For example, in some embodiments the interface switch may be operable in use so that, when switched, the automatic winding mechanism is wound for a given length of time. This may be desirable as in certain situations a user may wish to demonstrate the operational use of the mechanical clock, or to test that the automatic winding of the mechanism is functioning correctly. In some embodiments the interface switch may be operable in use so that, when switched, the clock may alter its configuration, such as its position. This may be desirable in situations where a user may wish to move the position of the clock for a better viewing angle or in some embodiments such that a crown wheel is presented to the user for altering the time on the clock itself. In some embodiments the interface switch may be operable in use to disconnect the clock from the vehicle for removal from the vehicle. In such embodiments, the watch may be configured such that under the operation of the interface switch it is moved to a certain position, through rotational or translational movement to a position where it may be disconnected from the vehicle. In some embodiments the interface switch is operable in use to perform two or more of the above-mentioned tasks.

The user interface switch may comprise a push button, or a flick switch, for example. In embodiments wherein the interface stich comprises a button, the button may be operable in use to perform one or more of the above-mentioned tasks upon depression of the button for a set period of time, or for a set number of times consecutively. In embodiments wherein the interface switch comprises a flick switch, the switch may be operable in use to perform one or more of the above-mentioned tasks upon movement of the switch from a first position to a second position for a set period of time, or for a set number of times consecutively.

The clock may be mounted in a holder. The holder may comprise the user interface switch. The clock may rotate in the holder in order to actuate the winding mechanism, and rotation of the clock in the holder may be powered by the electrical system of the vehicle.

According to a second aspect of the present invention there is provided a vehicle comprising a mechanical clock in accordance with the first aspect of the present invention.

The mechanical clock may comprise any or all of the features of a mechanical clock of any one of the first to fourth aspects of the present invention as desired or appropriate.

In some embodiments the mechanical clock is positioned on or within a dashboard of the vehicle. In other embodiments the mechanical clock may be positioned on or within a centre console of the vehicle.

DETAILED DESCRIPTION OF THE INVENTION

In order that the invention may be more clearly understood embodiments thereof will now be described, by way of example only, with reference to the accompanying drawings, of which:

FIGS. 1-4 are a series of schematic diagrams illustrating a clock in accordance with the present invention.

FIGS. 1 to 4 illustrate a mechanical clock 2 of the present invention showing various operational uses. The clock 2 is an automatic, self-winding clock. The clock 2 is housed a holder 4 which is mounted in the dashboard or centre console of a vehicle (not shown), for example. The clock 2 houses the clock mechanisms including a winding mechanism and is rotated in the holder 4 via a rotating mechanism (not shown). The clock 2 includes a clock face 6 and comprises a crown wheel 8 and indicia in the form of Arabic numerals 10 thereon. The crown wheel 8 is operable in use to alter the position of the hands of the clock 2 (not shown) manually. In addition, the holder 4 includes a user interface switch in the form of a button 12 located at the bottom of the holder 4 in the orientation shown in the Figures.

Although not shown in the Figures, it is to be understood that the clock 2 is electrically connected to the electrical circuitry of the vehicle. In this way, the winding mechanism may be wound automatically via rotation of the clock 2 within the holder 4 which is powered by a battery within the vehicle, which may be the vehicle battery itself.

The Figures illustrate the clock 2 in a number of different configurations and show the operational use of the clock 2. FIG. 1 shows the clock 2 in its resting position, i.e. the position which it is in for the majority of the time wherein it displays the time to a user. In this position, the clock face 6 is positioned such that the numeral 12 (indicia 10) is shown centred and at the top of the clock 2.

Figure 2:
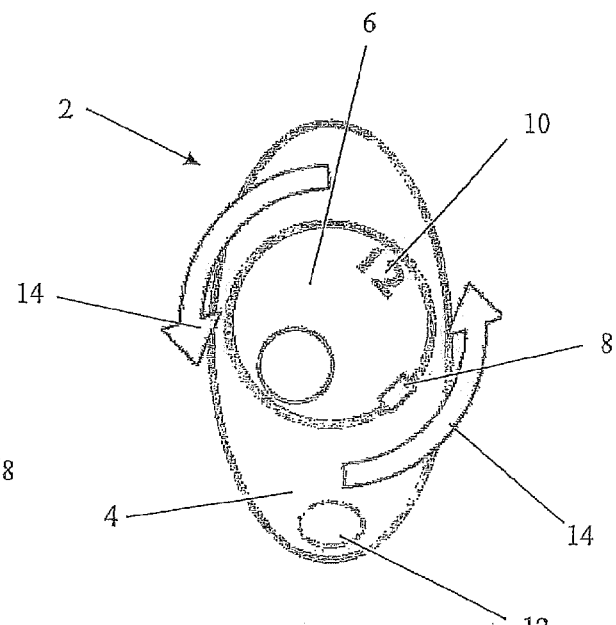

FIG. 2 illustrates the automatic winding of the clock 2. To wind the clock 2, the clock 2 is rotated with respect to the holder 4 in the direction shown by arrows 14 on FIG. 2 (although it is to understood that the clock 2 may be configured such that it may be rotated in the opposite sense). The rotation of the clock 2 with respect to the holder 4 acts to wind the winding mechanism of the clock (not shown) to ensure that the clock 2 functions as is required, i.e. keeps time and does not lag. The rotation of the clock 2 is powered by the electrical system of the connected vehicle.

It is envisaged that the clock 2 will rotate constantly for a set period of time, or for a set number of rotations, in order to wind the winding mechanism of the clock 2. Furthermore, this rotation of the clock 2 will be performed in a periodic manner, for example, every hour, in order to ensure that the clock 2 remains functional. This may be performed irrespective of whether the vehicle to which the clock 2 is connected is in use.

To ensure that the clock face 6 is returned to the position shown in FIG. 1 subsequent to winding, the clock 2 may additionally comprise a sensor (not shown), which in some cases will comprise an optical sensor located on either the body of the clock 2 or on the clock face 6 operable to detect the rotational position of the clock 2 or clock face 6, in use.

The sensor may additionally be used to check whether the clock 2 and/or clock face 6 is in the correct position during 'normal' use, i.e. when the winding mechanism is not being wound. This is illustrated figuratively in FIG. 4 where the clock face 6 has been rotated with respect to the body 4 in the direction shown by arrow 20. This unwanted rotation may have been caused by vibrations from the vehicle to which the clock 2 is connected to. If such a rotation occurs, the sensor may detect this and in doing so, instruct the clock 2 to rotate back to the correct position. In this way, the clock face 6 is kept in the correct position at all times. Again, this rotation may be powered by the electrical system of the vehicle to which the clock 2 is connected.

Figure 3:
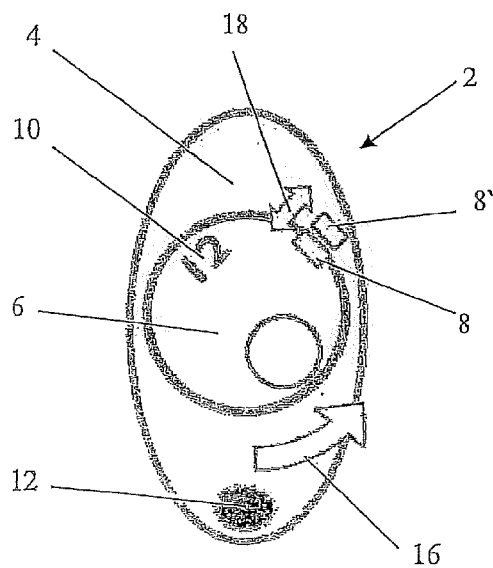
Figure 4:
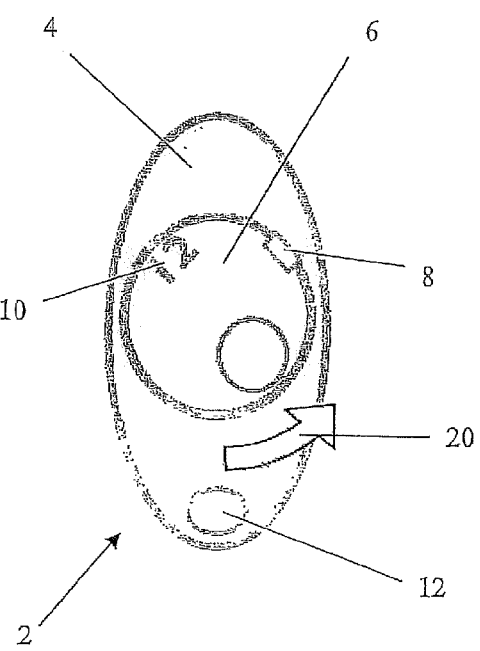

FIG. 3 illustrates a further feature of the clock 2 of the invention showing an operational use of the user interface button 12. Depression of the button 12 acts to instruct the clock 2 to rotate with respect to the holder 4 (in the direction shown by arrow 16) through a given angle in order to present the crown wheel 8 to a user. The crown wheel 8 may subsequently be moved manually, for example in a direction illustrated by arrow 18 to a second position (shown by reference numeral 8' on FIG. 3). In this position, the crown wheel 8 may then be rotated axially with respect to the clock face 6 in order to alter the position of the hands of the clock 2.

The button 12 may additionally be operable to perform further tasks with regards to the operation of the clock 2. For example, depression of the button 12 may cause the clock 2 to rotate once through 360°. In this way, the winding of the winding mechanism may be undertaken 'manually' to either simply display this feature, or to check that automatic winding of the mechanical clock 2 is functioning correctly. Furthermore, the button 12 may also be operable, upon depression, to rotate the clock 2 with respect to the body 4 to a position whereby the clock 2 itself disconnects from the connected vehicle. This may be desirable to enable the clock 2 to be removed for servicing or cleaning, for example. It is envisaged that the button 12 may be used to perform two or more of the above actions and in such cases the length of time for which the button is depressed, or indeed the number of times the button is depressed consecutively may be different depending on which action is to be undertaken.

Whilst the clock 2 illustrated in the Figures is shown to rotate per se in other embodiments the clock 2 may have a rotatable clock face 6 which acts to wind the winding mechanism, the clock face being rotatably connected to a stationary clock body and/or the clock 2 may include an alternative or additional means to wind the winding mechanism, such as a winding key, for example.

The above embodiments are described by way of example only. Many variations are possible without departing from the scope of the invention as defined in the appended claims.

The invention claimed is:

1. A motor vehicle comprising a mechanical clock rotatably mounted in a holder which is mounted in the motor vehicle, the mechanical clock having a winding mechanism automatically wound through rotational movement of the clock relative to the holder; the vehicle having an automatic winding system including a clock moving mechanism powered by an electrical system of the motor vehicle for rotating the clock in the holder, the automatic winding system configured to operate the clock moving mechanism in accordance with a set of predetermined instructions stored within the electrical system of the motor vehicle for controlling winding operations of the clock, the automatic winding system being operable in use such that subsequent to rotation of the clock for a set period of time, the clock is returned to a first set position, the automatic winding system having a user interface switch selectively operable in use to override the predetermined, stored instructions and cause the rotating mechanism to initiate rotation of the clock in the holder on demand in response to actuation of the switch by the user, wherein the clock comprises a rotational mechanism operable in use to rotate one or more hands of the clock to indicate the time to a user, the clock comprises a crown wheel operable in use to act upon the rotational mechanism to move the hand(s) of the clock and the user interface switch is operable to cause the clock moving mechanism to move the clock itself to a second set position, different from the first set position, so as to present the crown wheel to a user for altering the time displayed by the clock whilst the clock is retained in the holder.

2. A motor vehicle as claimed in claim 1 wherein the automatic winding system is operable in use to continuously wind the winding mechanism.

3. A motor vehicle as claimed in claim 1 wherein the automatic winding system is operable in use to wind the winding mechanism in a periodic manner.

4. A motor vehicle of claim 1 wherein a face of the clock comprises one or more indicators thereon.

5. A motor vehicle as claimed in claim 4 wherein the first set position to which the clock is returned subsequent to winding comprises a position whereby an indicator for 12 o'clock is centred at a top of the clock.

6. A motor vehicle as claimed in claim 1 additionally comprising a positional sensor operable to determine the rotational position of the clock relative to the holder.

7. A motor vehicle as claimed in claim 6 wherein the positional sensor is operable to determine whether the clock has been returned to its first set position subsequent to movement of the clock itself.

8. A motor vehicle as claimed in claim 6 wherein the positional sensor is operable to detect unwanted rotation of the clock from the first set positon and, on doing so, instruct the clock moving mechanism to move the clock to the first set position.

9. A motor vehicle as claimed in claim 6 wherein the positional sensor comprises an optical sensor.

10. A motor vehicle as claimed in claim 1 wherein the automatic winding system is operable in use to automatically wind the winding mechanism of the clock irrespective of whether the engine of the vehicle is operational or is turned off.

11. A motor vehicle as claimed in claim 1 wherein the holder comprises the user interface switch.

12. A motor vehicle as claimed in claim 1 wherein the interface switch is operable in use so that, when switched, the automatic winding mechanism is wound for a given length of time.

13. A motor vehicle as claimed in claim 1 wherein the interface switch is operable in use so that, when switched, the clock moving mechanism is operative to alter the position of the clock in the holder.

14. A motor vehicle as claimed in claim 1 wherein the interface switch is operable in use to cause the clock to rotate in the holder to a position at which it can be disconnected from the vehicle for removal from the vehicle.

15. A motor vehicle as claimed in claim 1 wherein the interface switch comprises a push button or a flick switch.

16. A motor vehicle as claimed in claim 1 wherein the mechanical clock is positioned on or within a dashboard of the vehicle.

17. A motor vehicle as claimed in claim 1 wherein the mechanical clock is positioned on or within a centre console of the vehicle.

* * * * *